UNITED STATES PATENT OFFICE.

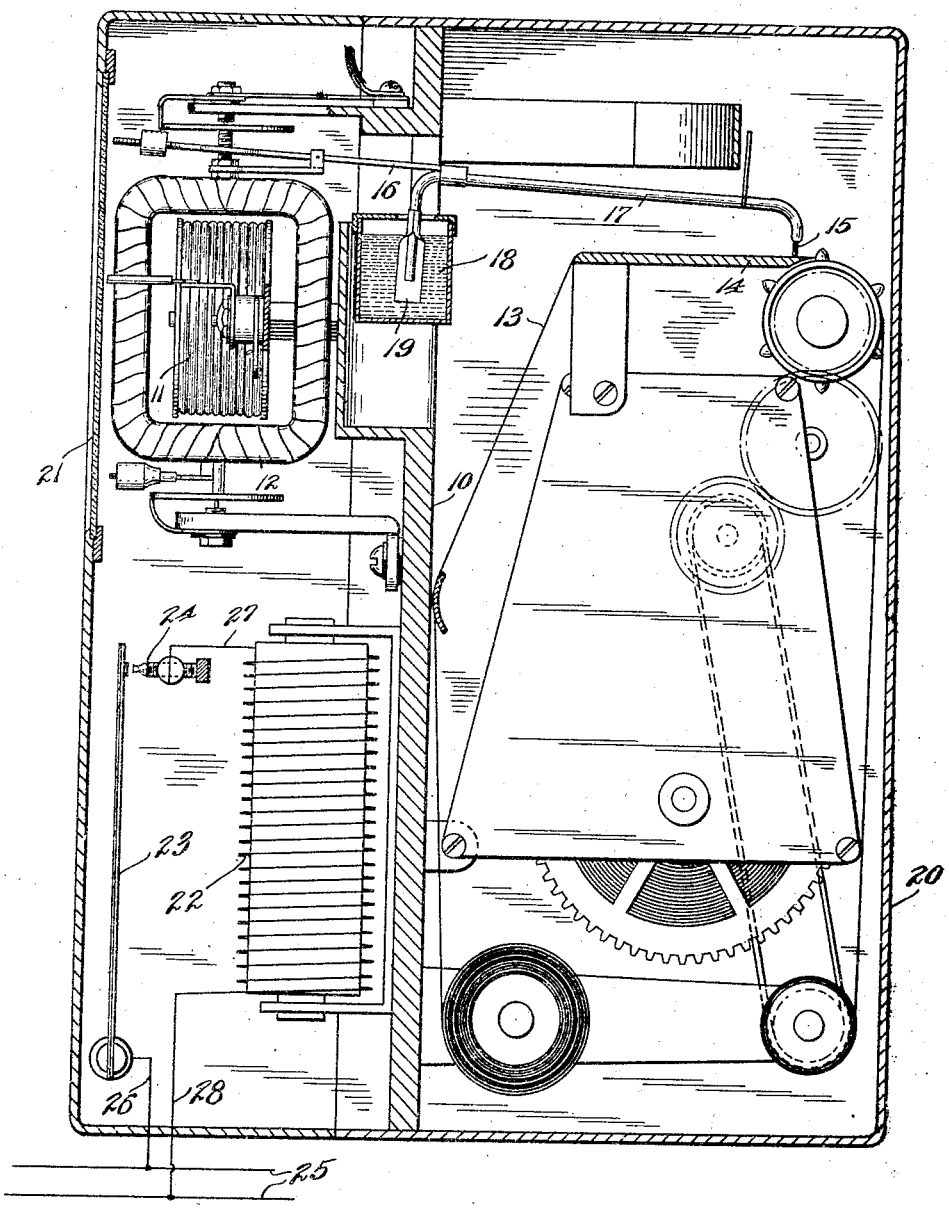

JOHN W. ESTERLINE, OF INDIANAPOLIS, INDIANA.

CONSTANT-TEMPERATURE RECORDING INSTRUMENT.

1,251,762.   Specification of Letters Patent.   Patented Jan. 1, 1918.

Application filed June 8, 1916. Serial No. 102,405.

*To all whom it may concern:*

Be it known that I, JOHN W. ESTERLINE, a citizen of the United States, residing at Indianapolis, in the county of Marion and State of Indiana, have invented a new and useful Constant-Temperature Recording Instrument, of which the following is a specification.

In indicating and recording instruments, much inaccuracy and many other difficulties result from changes in the temperature of the instrument. For instance, upon changes in temperature inaccuracies result from errors due to changes in the resistance of the meter coils in electrical instruments, errors due to expansion and contraction of the meter parts and the changes in the dimensions and the condition of the record sheet, errors due to changes in the viscosity of the damping fluid, which in case of extreme cold may even freeze and stop the operation of the instrument entirely; and in recording instruments great difficulty arises because the recording ink changes in viscosity so that by reason of the stiffening or even freezing of this recording liquid the record is not made.

It is the object of my invention to avoid these inaccuracies and other difficulties. In obtaining this object, I mount the instrument in a closed case, and provide a heating coil which is controlled by a thermostat responsive to the temperature within such case, so as to maintain such temperature substantially constant.

The accompanying drawing illustrates my invention, as applied to a recording watt-meter in which the recording fluid also serves as the damping fluid. The single figure of the drawing is a vertical section through such a recording meter.

The recording watt-meter in connection with which I have illustrated this invention is of the dead-beat type shown in my co-pending application Ser. No. 75,197, filed January 31, 1916. It comprises a central vertical partition 10 which supports on one side a fixed current coil 11 and a pivoted voltage coil 12 and on the other side suitable mechanism for driving a recording sheet 13 over a plate 14 in position to be marked upon by a moving pen 15 carried by an arm 16 which moves with the movable voltage coil 12, the connections of the coils 11 and 12 not being shown; and the ink for the pen 15 is obtained through a capillary tube 17 which at its rear end dips into a recording ink supply in an ink well 18, the end of the capillary tube dipping into such ink being provided with a paddle 19 which is moved through the ink as the voltage coil 12 turns and by the resistance offered by the ink serves to damp out the vibrations of such voltage coil 12, the arm 16, and the pen 15, and to make the instrument dead-beat.

This instrument is inclosed within a casing 20, which is shown as being provided with suitable windows 21 for inspecting the moving parts. Mounted within this casing 20 is a heating coil 22, shown as supported on the middle partition 10 below the current and voltage coils 11 and 12, and a thermostat 23 fixed at one end and movable at the other upon changes in temperature into and out of engagement with an adjustable contact 24. The thermostat 23 is connected in the circuit of the heating coil 22, which may be supplied from any suitable source of current, such as the mains 25. As shown, the fixed end of the thermostat is connected by a wire 26 to one of the mains 25, the adjustable contact 24 by a wire 27 to one end of the heating coil 22, and the other end of such heating coil by a wire 28 to the other main 25. The thermostat 23 is shown as of the ordinary two-metal type, but may be of any desired type.

In operation, the contact 24 is adjusted for the desired normal temperature of the instrument. If the temperature within the casing 20 falls, the thermostat arm 23 moves into engagement with the contact 24 to complete the circuit of the heating coil 22 so that it will develop heat to increase such temperature within the casing 20. If such temperature rises, the thermostat arm 23 moves out of engagement with the contact 24 to break the circuit of the heating coil 22 so that it will cease developing heat and the temperature within the casing 20 may fall. As a result, the temperature within the casing 20 may be kept substantially constant, within very close limits.

As a result of this constant temperature, the following advantages are obtained:

1. The accuracy of the instrument is increased, by the elimination of errors due to the changes in resistance of the meter coils upon changes in temperature.

2. The accuracy of the instrument is increased, by the elimination of errors due to the changes in the dimensions of the parts.

3. The accuracy of the instrument is increased, by keeping the record sheet in a uniform condition and of constant dimensions.

4. The accuracy of the instrument is increased, by keeping the damping fluid, which in the case illustrated is also the recording fluid, in a state of uniform viscosity, thus maintaining a constant damping effect and eliminating changes due to expansion or contraction.

5. The recording ink is maintained in a state of uniform viscosity, so that it flows uniformly to make a uniform record line, and blots and thin places in the recording line are avoided by the elimination of expansion and contraction.

6. Freezing of the recording and damping fluid is prevented, thus avoiding the stoppage of the instrument or the loss of a record as the result of such freezing.

I claim as my invention:

1. In an electric meter, the combination of the electro-magnetically relatively movable meter parts, an inclosing casing therefor, an electric heating coil within such casing, and a thermostat responsive to the temperature in such casing and controlling such heating coil to maintain a substantially constant temperature within said casing.

2. In a recording meter, the combination of a record sheet, a marking device movable over such record sheet, mechanism for moving such marking device, a damping device containing liquid, an inclosing casing for said parts, an electric heating coil within said casing, and a thermostat responsive to the temperature within said casing and controlling said heating coil to maintain a substantially constant temperature within said casing.

3. In a recording meter, the combination of a record sheet, a marking device movable over such record sheet, mechanism for moving such marking device, an inclosing casing for said parts, an electric heating coil within said casing, and a thermostat responsive to the temperature within said casing and controlling said heating coil to maintain a substantially constant temperature within said casing.

4. In a recording meter, the combination of a record sheet, a marking device movable over such record sheet, mechanism for moving such marking device, a well from which said marking device obtains a supply of marking fluid, an inclosing casing for said parts, an electric heating coil within said casing, and a thermostat responsive to the temperature within said casing and controlling said heating coil to maintain a substantially constant temperature within said casing.

5. In a recording meter, the combination of a record sheet, a marking device movable over such record sheet, mechanism for moving such marking device, said marking device being supplied through a feed tube, a well into which the intake end of said feed tube dips, a paddle movable with said marking device and dipping into said well, an inclosing casing for said parts, an electric heating coil within said casing, and a thermostat responsive to the temperature within said casing and controlling said heating coil to maintain a substantially constant temperature within said casing.

6. In a recording meter, the combination of a record sheet, a marking device movable over such record sheet, mechanism for moving such marking device, said marking device being supplied through a feed tube, a well into which the intake end of said feed tube dips, an inclosing casing for said parts, an electric heating coil within said casing, and a thermostat responsive to the temperature within said casing and controlling said heating coil to maintain a substantially constant temperature within said casing.

7. In a meter, the combination of relatively movable mechanism movable in accordance with the condition, other than temperature, to be measured, an inclosing casing for said mechanism, a heating device for supplying heat to the interior of said casing, and a thermostat responsive to the temperature within said casing and controlling said heating device to maintain a substantially constant temperature within said casing.

8. In a meter, the combination of metering parts controlled in accordance with the condition, other than temperature, to be measured, an inclosing casing for said parts, a heating device for supplying heat to the interior of said casing, and a thermostat responsive to the temperature within said casing and controlling said heating device to maintain a substantially constant temperature within said casing.

9. In a meter, the combination of metering parts controlled in accordance with the condition, other than temperature, to be measured, an inclosing casing for said parts, an electric heating coil located within said casing, and a thermostat responsive to the temperature within said casing and controlling the supply of current to said heating coil to maintain a substantially constant temperature within said casing.

In witness whereof, I have hereunto set my hand at Indianapolis, Indiana, this twenty-second day of May, A. D. one thousand nine hundred and sixteen.

JOHN W. ESTERLINE.